(12) United States Patent
Schermanz et al.

(10) Patent No.: US 9,475,035 B2
(45) Date of Patent: Oct. 25, 2016

(54) CERIA ZIRCONIA ALUMINA COMPOSITION WITH ENHANCED THERMAL STABILITY

(75) Inventors: Karl Schermanz, Launsdorf (AT); Amod Sagar, Althofen (AT)

(73) Assignee: Treibacher Industrie AG, Treibach-Althofen (AT)

( * ) Notice: Subject to any disclaimer, the term of this patent is extended or adjusted under 35 U.S.C. 154(b) by 179 days.

(21) Appl. No.: 14/128,067

(22) PCT Filed: Jun. 12, 2012

(86) PCT No.: PCT/EP2012/061110
§ 371 (c)(1),
(2), (4) Date: Dec. 20, 2013

(87) PCT Pub. No.: WO2013/004456
PCT Pub. Date: Jan. 10, 2013

(65) Prior Publication Data
US 2014/0141967 A1    May 22, 2014

(30) Foreign Application Priority Data
Jul. 1, 2011   (EP) .................................... 11005382

(51) Int. Cl.
| | | |
|---|---|---|
| B01J 23/10 | (2006.01) | |
| B01J 37/00 | (2006.01) | |
| B01J 37/03 | (2006.01) | |
| C01G 25/02 | (2006.01) | |
| B01J 35/10 | (2006.01) | |
| B01J 37/02 | (2006.01) | |

(52) U.S. Cl.
CPC ............ B01J 23/10 (2013.01); B01J 35/1014 (2013.01); B01J 35/1019 (2013.01); B01J 37/0018 (2013.01); B01J 37/0203 (2013.01); B01J 37/03 (2013.01); C01G 25/02 (2013.01); *B01J 2523/00* (2013.01); *C01P 2002/52* (2013.01); *C01P 2006/12* (2013.01); *C01P 2006/13* (2013.01)

(58) Field of Classification Search
CPC ...... B01J 23/10; B01J 37/0203; B01J 37/03; B01J 37/1014; B01J 35/1019; B01J 35/1014; B01J 2523/00; C01G 25/02; C01P 2006/13; C01P 2006/12; C01P 2002/52
See application file for complete search history.

(56) References Cited

U.S. PATENT DOCUMENTS

| | | | |
|---|---|---|---|
| 6,150,288 A | 11/2000 | Suzuki et al. | |
| 6,306,794 B1 | 10/2001 | Suzuki et al. | |
| 7,939,041 B2 | 5/2011 | Darab | |
| 2008/0096760 A1* | 4/2008 | Darab .................... | B01J 23/002 502/303 |
| 2009/0185967 A1 | 7/2009 | DeMourgues et al. | |
| 2009/0274599 A1* | 11/2009 | Larcher ................ | B01D 53/945 423/213.2 |
| 2012/0122671 A1 | 5/2012 | Polli et al. | |
| 2012/0129690 A1* | 5/2012 | Larcher ................... | B01J 21/12 502/304 |

FOREIGN PATENT DOCUMENTS

| | | |
|---|---|---|
| CN | 1695798 A | 11/2005 |
| CN | 101 690 890 A | 4/2010 |
| DE | 69 517 440 T2 | 1/2001 |
| EP | 0 718 239 A1 | 6/1996 |
| EP | 0 834 348 A2 | 4/1998 |
| EP | 1 172 139 A1 | 1/2002 |
| EP | 1 206 965 A1 | 5/2002 |
| EP | 1 900 416 A2 | 3/2008 |
| EP | 1 977 823 A1 | 10/2008 |
| EP | 2 223 905 A1 | 9/2010 |
| JP | 10194742 A | 7/1998 |
| JP | 2005104799 A | 4/2005 |
| JP | 2005246177 A | 9/2005 |
| JP | 2008150264 A | 7/2008 |
| JP | 2008526660 A | 7/2008 |

(Continued)

OTHER PUBLICATIONS

Suzuki et al., "Alumina-Deria-Zirconia Composite Oxide for Three-Way Catalyst"; R&D Review of Toyota CRDL, vol. 37 No. 4, 2002.

(Continued)

*Primary Examiner* — Anthony J Zimmer
(74) *Attorney, Agent, or Firm* — Greenerg Traurig, LLP

(57) ABSTRACT

A process for the preparation of a composition comprising Al—, Ce— and Zr-oxides, which process comprises the steps of (a) preparing an aqueous solution of a mixture of metal salts of cerium, zirconium and aluminium, which aqueous solution optionally comprises one or more salts of the Rare Earth Metals other than cerium, (b) adding to the solution obtained a base at temperatures from 0° C. to 95° C. and precipitating the mixed metal salts in the form of hydroxides or oxy-hydroxides, (d) treating the aqueous suspension obtained in step (b) with a surfactant, and (e) isolating the precipitate obtained in step (d) and treating said precipitate at a temperature from 450° C. to 1200° C., which process is characterized in that the alumina content is in the range from 35 to 80% by weight, and the surface area (BET) of the composition obtained, measured according to DIN (Deutsche Industrie Norm) 66131 after calcining for 2 hours at 1100° C. is from 55 to 80 m$^2$/g; or is at least 35 m$^2$/g after calcining for 20 hours at 1100° C.; and a composition comprising Al—, Ce— and Zr-oxides, characterized in that the aluminium content, calculated as aluminium oxide is in the range from 35 to 80% by weight, and the surface area (BET) of the composition measured according to DIN (Deutsche Industrie Norm) 66131 for 2 hours at 1100° C. is from 55 to 80 m$^2$/g, and/or is at least 35 m$^2$/g after calcining for 20 hours at 1100° C. obtainable or obtained according such process.

8 Claims, No Drawings

(56) References Cited

FOREIGN PATENT DOCUMENTS

| | | |
|---|---|---|
| WO | 2006/070201 A2 | 7/2006 |
| WO | 2006/070203 A1 | 7/2006 |
| WO | 2007/093593 A1 | 8/2007 |
| WO | 2008/113457 A1 | 9/2008 |
| WO | 2011/070439 A1 | 6/2011 |

OTHER PUBLICATIONS

International Search Report from International Application No. PCT/EP2012/061110 dated Aug. 30, 2012.
Written Opinion of the International Searching Authority from International Application No. PCT/EP2012/061110 dated Aug. 30, 2012.

\* cited by examiner

CERIA ZIRCONIA ALUMINA COMPOSITION WITH ENHANCED THERMAL STABILITY

This application is a national phase filing under 35 USC 371 of International Application No. PCT/EP2012/061110, filed on Jun. 12, 2012, which claims the benefit of European Application No. 11005382.4, filed on Jul. 1, 2011, the entirety of these applications is hereby incorporated herein by reference for the teachings therein.

The present invention relates to compositions based on ceria (oxide of cerium), zirconia (oxide of zirconium) and alumina (oxide of aluminium) with enhanced thermal stability.

Such compositions may be used as washcoats in the application of exhaust gas aftertreatment of combustion engines such as fuel- and diesel engines, e.g. as components of catalysts (mainly Three Way Catalysts, TWC) but also in other parts integrated into the exhaust stream such as NOx traps, Diesel Oxidation Catalysts (DOC) and Diesel Particulate Filters (DPF).

Ceria-Zirconia based mixed oxides and alumina are widely used in automotive application for the catalyst preparation. For example, in WO 2008/113457 the preparation of washcoats introducing separateley mixed oxides of ceria/zirconia and alumina (lanthanum doped aluminium oxide) is described and thus is a well established process.

However, there is also drawn attention to other types of composition materials consisting of $Al_2O_3$ with the balance typically being $CeO_2$, $ZrO_2$ and perhaps some stabilizers such as rare earth metal oxides.

For example, in EP 1 172 139 there is reported on the preparation and the thermal stability of several Al—Ce—Zr—Y—La oxide compositions. There are disclosed various compositions consisting of $Al_2O_3/CeO_2/ZrO_2/Y_2O_3/La_2O_3$ with different ratios of the oxides being present in the compositions. The materials are described to be prepared via co-precipitation starting from the corresponding metal salt solutions (including the alumina in form of Al-nitrate). As intermediates after conducting the co-precipitation process suspensions of Al—Ce—Zr—Y—La hydroxides were yielded which after calcination were transferred into the corresponding oxides (see page 8, lines 1 to 6). The surface area of such composition oxides is described to be dependent on the amount of $Al_2O_3$ being present in the composition. In examples 10 to 22 in which the $Al_2O_3$ content is in the range between 21 and 25% by weight (calculated from the molar ratios disclosed in table 2) the specific surface area is less than 15 $m^2/g$ after the compounds have been subjected to heat treatment at 1100° C. for 20 hours (see table 2 page 14). Higher values of the surface area are indicated after heat treatment at 1100° C. /20 hours in case that the $Al_2O_3$ content is increased as disclosed in the examples 24, 27 and 31. More in detail, in example 24, corresponding to a composition with an $Al_2O_3$ content of 57% weight, there is disclosed a surface area of 27 $m^2/g$ after calcination at 1100° C./20 hours, and in examples 27 and 31 which correspond to an $Al_2O_3$ content of 63% surface areas of 31 $m^2/g$ and 30 $m^2/g$, respectively, after calcination at 1100° C./20 hours are indicated.

In JP 2005246177 (A), in the "comparative example 4" there is described the preparation of an $Al_2O_3/CeO_2/ZrO_2$ composite oxide (molar ratio $Al_2O_3/CeO_2/ZrO_2=1/0.9/1.1$, expressed in weight %=26 parts of $Al_2O_3$, 39.5 parts of $CeO_2$ and 34.5 parts of $ZrO_2$) via the co-precipitation route. In the course of investigating the present invention a material was prepared according to the process disclosed in JP 2005246177 (A) and the BET thereof was measured. A BET of 6.8 $m^2/g$ after calcination at 1100° C./2 hours and of 4.8 $m^2/g$ after calcination at 1100° C./20 hours was obtained. From that experiment it is evident that after calcining the material at 1100° C./2 hours the surface area drops significantly. The drop of the surface area is even more pronounced when heat treated at 1100° C./20 hours.

In CN 101 690 890 a process for the preparation of a composition comprising Al—, Ce—, Zr-oxides and rare earth oxides is disclosed. The process comprises the steps of preparing a solution of a mixture of metal salts of cerium, zirconium, aluminium and of a rare earth and adding a surfactant chosen from polyethylene glycol, polyvinyl alcohol, polyacrylamide, cetylammoniumbromide or cetylammoniumchloride. It is indicated that a surface area of >35 $m^2/g$ after calcining the materials at 1050° C./5 hours is achieved. A material which was prepared according to the process disclosed in CN 101 690 890 having 20% $Al_2O_3$, 50% $CeO_2$, 27.5% $ZrO_2$ and 2.5% $La_2O_3$ using cetylammoniumbromide as a surfactant was tested in the course of investigating the present invention and it was found that a surface area of 24.9 $m^2/g$ after calcination at 1050° C./5 hours is obtained. The surface area, however, drops significantly to a value of 9.9 $m^2/g$ when the material is calcined at 1100° C./20 hours. Since the BET after calcination at 1050° C./5 hours is already as low as 24.9 $m^2/g$, it reasonably may be concluded that after calcination at 1100° C./2 hours the surface area will be similar low. A higher calcination temperature will even cause a further drop which might be compensated by a shorter calcination time. Also, a material which was prepared according to a process disclosed in CN 101 690 890 having 40% $Al_2O_3$, 45% $CeO_2$, 12.5% $ZrO_2$ and 2.5% $La_2O_3$ using cetylammoniumbromide as a surfactant exhibits a surface area of 48 $m^2/g$ after calcination at 1050° C./5 hours. The surface area, however, was shown to drop significantly to a value of 26.9 $m^2/g$ when the material was calcined at 1100° C./20 hours. Furthermore, a material which was prepared according to a process disclosed in CN 101 690 890 having 40% $Al_2O_3$, 45% $CeO_2$, 12.5% $ZrO_2$ and 2.5% $La_2O_3$ using polyethyleneglycole as a surfactant exhibits a surface area of 42.5 $m^2/g$ after calcination at 1050° C./5 hours. The surface area, however, was shown to drop to a value of 36.8 $m^2/g$ after calcination at 1100° C./2 hrs and to a value of 34.3 $m^2/g$ when the material was calcined at 1100° C./20 hours. In addition, a material which was prepared according to a process disclosed in CN 101 690 890 having 40% $Al_2O_3$, 45% $CeO_2$, 12.5% $ZrO_2$ and 2.5% $La_2O_3$ using polyacrylamide as a surfactant exhibits a surface area of 31.2 $m^2/g$ after calcination at 1050° C./5 hours. The surface area, however, was shown to drop to a value of 28.4 $m^2/g$ after calcination 1100° C./2 hours and to a value of 24.5 $m^2/g$ when the material was calcined at 1100° C./20 hours.

In EP 1 900 416 there is disclosed an Al—Ce—Zr—Y—La-oxide [e.g. paragraph 0045] obtained via co-precipitation. In the course of investigating the present invention, however, it was found that the Al—Ce—Zr—Y—La-composite oxide prepared according to the description given in EP 1900416, after heat treatment at 1100° C./2 hours exhibits a surface area of 30.9 $m^2/g$ and of 21.2 $m^2/g$ after heat treatment at 1100° C. /20 hours.

In WO 2006/070201 there is reported an improved method for the formation of composition hydroxides or oxides comprising, on an oxide basis, alumina ($Al_2O_3$) and Zirconia ($ZrO_2$), and optionally including at least one member selected from $CeO_2$, $La_2O_3$, $Nd_2O_3$, $Pr_6O_{11}$, $Sm_2O_3$, $Y_2O_3$ and optionally other rare earth metal oxides. The compositions are described to be made by co-precipitation starting from a metal salt solution using caustic alkali as a precipitation agent. A strict small pH range is to be kept: According to WO 2006/070201 the deviation of the pH during precipitation must not be more than ±1. Furthermore the process requires an autoclaving step of the isolated precipitate at 120° C. prior to the final calcination of the material establishing a disadvantage of said preparation process. In example 6 of WO 2006/070201 an Al/Ce/Zr-composition oxide is reported consisting of 51% $Al_2O_3$, 14.2% $CeO_2$ and 34.8% $ZrO_2$ exhibiting a surface area of 43 $m^2/g$ after being heat treated at 850° C./4 hours and at 1100° C./2 hours. After more severe ageing (heat treatment at 850° C./4 hours and 1200° C./2 hours) the composition exhibits a surface area of 16 $m^2/g$ only. To investigate the properties of heat stability after ageing for a longer period of time in the course of investigating the present invention the compound was synthesized according to the method of example 6 of WO 2006/070201. The surface area values found after heat treatment at 1100° C./2 hours were 41.2 $m^2/g$ and the BET after 1150° C. 36 hours turned out to be with 19 $m^2/g$ rather low.

In U.S. Pat. No. 7,939,041 there are reported surface areas of various Al—Ce—Zr composite oxides after calcination 1100° C./2 hours which composite oxides were synthesized via the co-precipitation route and an additional treatment of the precipitate in an autoclave. The highest surface area after calcination at 1100° C./2 hours reported is 48 $m^2/g$ and relates to a composite oxide consisting of 46.2% $Al_2O_3$, 26.3% $CeO_2$, 3.3% $Pr_6O_{11}$ and 24.2% $ZrO_2$.

A different preparation method for a Ce—Zr—Al composite oxide spheres, not using a co-precipitation step is described in EP 718 239 A1, example 7. The Al-starting material is not a water soluble Al salt but an aluminiumoxide-hydrate (as referred to also in DE 69 517 440 T2), thus the process being not a co-precipitation process. The $Al_2O_3$ content in the composite oxide referred to is 7% only, $CeO_2$ being 29.9% and $ZrO_2$ being 63%. There are not given any values on surface areas after heat treatment of the spheres at >800° C. However, since the composition is mainly based on $ZrO_2/CeO_2$ and the surface area is already relatively low after calcination at 800° C. (70 $m^2/g$) it can reasonably be concluded (e.g. under consideration of prior art, such as EP 2 223 905 in which Zr/Ce-Oxide based materials are described) that such composition will exhibit a surface area well below 30 $m^2/g$ after heat treatment at 1100° C./20 hours.

It is known from prior art such as EP 2 223 905 that the surface stability of Ceria/Zirconia Mixed Oxides may be enhanced by a treatment of the precipitated metals with a surfactant. This is outlined in several examples, in which a precipitate of the metals is treated e.g. by lauric acid followed by converting the treated precipitate into mixed oxides. The surface area after heat treatment of the Ceria/Zirconia mixed oxides at 1100° C./4 hours exhibits values up to approximately 22 $m^2/g$ only.

In comparative example C10 of the present application it is shown that a ceria/zirconia mixed oxide consisting of exactly the same element ratio (based on Rare earths) as used in example 1 according to the present invention exhibits a surface area of 18 $m^2/g$ after heat treatment at 1100° C./4 hours when a surfactant treatment is applied in the process. The increase of the surface stability after heat treating the compound at 1100° C./4 hours of the mixed ceria-zirconia oxide even after surface treatment is relatively low compared to other mixed ceria/zirconia mixed oxides known from prior art. For example, in WO 2007/093593 there are disclosed ceria/zirconia mixed oxides exhibiting surface areas up to 32 $m^2/g$ after heat treatment at 1100° C./10 hours. In addition it is shown in comparative example C11 and C12 of the present application that Aluminium Oxides prepared from Aluminium-Nitrate Nona Hydrate, the same starting material as used in example 1 according to the present invention, exhibits extremley low surface areas after being subjected to precipitation and conversion into the corresponding oxides, even after treatment with a surfactant. Thus, the Alumina prepared by precipitation and conversion into the Oxide exhibits a surface area of 1 $m^2/g$ only after being heat treated at 1100° C./4 hours. A surfactant treatment of the precipitate, as shown in comparative example C12, exhibits a surface area of 6.1 $m^2/g$ only after a heat treatment of the precipitate at 1100° C./4 hours. Therefore a mixture of 50% Ceria/Zirconia and 50% Alumina, both prepared by a separate precipitation process and additionally applying a surfactant as known to prior art will yield a Composite oxide with a surface area of <15 $m^2/g$ only.

From the data disclosed in EP 2 223 905 and out of the performed experiments as mentioned above it may be concluded reasonably that a composition made from Metal Nitrate Solutions based on Ce/Zr and Alumina, respectively, made via precipitation and using a surfactant will result in a product with low surface stability only. The examples demonstrate that it is impossible to prepare a thermostable composition based on Ceria Zirconia-Alumina even with the help of a surfactant.

From examples outlined in EP 1 172 139, e.g. from example 24 (a Ce/Zr compound containing 57% Alumina) and example 26 (a Ceria/Zirconia compound containing 46% Alumina) it may be concluded that a co-precipitation process might contribute moderately to the surface stability of the yielded composite oxide. However, compounds showing an Alumina content up to 60% exhibit in fact a moderate surface stability only, not exceeding values of 32 $m^2/g$ after calcination of the compounds at 1100° C./20 hours. This conclusion was confirmed also by the experiment as described in comparative example C1 in the present application. In case that the co-precipitation process is performed according to the process disclosed in EP 1 172 139 with a compound relating to the same composition as disclosed in example 1 of the present invention in fact leads to a material showing a surface area of 30.7 $m^2/g$ after ageing at 1100° C./20 hours only. After a shorter time of calcination eg 1100° C./2 hours there is measured a surface area of 47 $m^2/g$ which drops significantly when the calcination time is extended to 20 hours.

The moderate increase of the surface area in a Alumina-Ceria-Zirconia Mixed Oxide (prepared via co-precipitation) after heat treatment in comparison to a separate precipitation of the Ceria/Zirconia and the Alumina may be attributed to the stabilization of a porous system in a Ceria Zirconia system by Alumina. Such a stabilization of a Ceria-Zirconia for example is described by Tadashi Suzuki et.al, R&D Review of Toyota CRDL, Vol. 37 Nr. 4, page 28 ff.

In spite of the fact that oxides of alumina and oxides of ceria/zirconia as well as composition oxides of Al/Ce/Zr are already used worldwide in automotive applications, there is still the need to improve production routes and the performance of such materials, especially in terms of their thermal stability to avoid a rather high drop of surface area when exposing such materials to higher temperatures and to enhance the life time of such catalysts.

In particular, the present invention is aimed to solve disadvantages related with the limited thermal stability of Al/Ce/Zr compositions and to provide compositions with enhanced surface stability, particularly after long term ageing.

Now it was surprisingly found that a synergistic effect on thermostability, yielding Ceria Zirconia Alumina Composite Oxides with significant higher thermostability after heat treatment at 1100° C./2 hours and/or at 1100° C./20 hours may be achieved when preparing the composite oxide according to the process according to the present invention.

In one aspect the present invention provides a process for the preparation of a composition comprising Al—, Ce— and Zr-oxides, which process comprises the steps of (a) preparing an aqueous solution of a mixture of metal salts of cerium, zirconium and aluminium, which aqueous solution optionally comprises one or more salts of Rare Earth Metals other than cerium, (b) adding to the solution obtained in step (a) a base, optionally in the presence of $H_2O_2$, at temperatures from 0° C. to 95° C., preferably room temperature, and precipitating obtained mixed metal salts in the form of hydroxides or oxy-hydroxides, (c) optionally isolating the precipitate obtained in step (b), d) treating the aqueous suspension obtained in step (b), or the isolated precipitate obtained in step (c) with a surfactant, and (e) isolating the precipitate obtained in step (d) and treating said precipitate at a temperature from 450° C. to 1200° C., preferably 600° C. to 1200° C., characterized in that the aluminium content, calculated as aluminium oxide obtained is in the range from 35 to 80% by weight, preferably 35 to 75% by weight, more preferably 35 to 65% by weight, such as 45 to 65% by weight, more preferably 40 to 60%, most preferably 45 to 55% by weight of the composition, and the surface area (BET) of the composition obtained, measured according to DIN (Deutsche Industrie Norm) 66131 after calcining for 2 hours at 1100° C. is from 55 $m^2/g$ to 80 $m^2/g$; and/or is at least 35 $m^2/g$, such as at least 38 $m^2/g$, for example 35 $m^2/g$, such as 38 $m^2/g$, to 80 $m^2/g$, e.g. 35 $m^2/g$, such as 38 $m^2/g$, to 65 $m^2/g$ after calcining for 20 hours at 1100° C.

In one preferred embodiment of the present invention a surfactant is selected, which results in a surface area (BET) from 55 $m^2/g$ to 80 $m^2/g$ of the composition obtained, measured according to DIN (Deutsche Industrie Norm) 66131 after calcining for 2 hours at 1100° C., and/or is at least 35 $m^2/g$, such as at least 38 $m^2/g$, for example 35 $m^2/g$, such as 38 $m^2/g$, to 80 $m^2/g$, e.g. 35 $m^2/g$, such as 38 $m^2/g$ to 65 $m^2/g$ after calcining for 20 hours at 1100° C.

In another preferred embodiment of the present invention the cerium content obtained, calculated as cerium oxide is in the range from 5 to 70% by weight, preferably 5 to 50% by weight, more preferably 5 to 30% by weight, most preferably 5 to 15% by weight of the composition obtained.

In another preferred embodiment of the present invention the zirconium content obtained, calculated as zirconium oxide is in the range from 5 to 70% by weight, preferably 10 to 60% by weight, more preferably 20 to 50% by weight, most preferably 30 to 40% by weight, of the composition obtained.

In another preferred embodiment the aluminium content, calculated as aluminium oxide obtained is in the range from 35 to 80% by weight, preferably 35 to 75% by weight, more preferably 35 to 65% by weight, such as 45 to 65% by weight, e.g. 40 to 60% by weight, most preferably 45 to 55% by weight of the composition.

In a further preferred embodiment of the present invention the cerium content obtained, calculated as cerium oxide is in the range from 5 to 70% by weight, preferably 5 to 50% by weight, more preferably 5 to 30% by weight, most preferably 5 to 15% by weight of the composition obtained; and/or the zirconium content obtained, calculated as zirconium oxide is in the range from 5 to 70% by weight, preferably 10 to 60% by weight, more preferably 20 to 50% by weight, most preferably 30 to 40% by weight of the composition obtained and/or the aluminium content, calculated as aluminium oxide obtained is in the range from 35 to 80% by weight, preferably 35 to 75% by weight, more preferably 35 to 65% by weight, more preferably 40 to 60% by weight, most preferably 45 to 55% by weight of the composition; and in another preferred aspect the cerium content, zirconium content and aluminium content are as described above in any combination of content ranges indicated.

In a further preferred embodiment of the present invention the aluminium content, calculated as aluminium oxide obtained is in the range from 35 to 75% by weight of the composition, and the surface area (BET) of the composition obtained, measured according to DIN (Deutsche Industrie Norm) 66131 after calcining for 2 hours at 1100° C. is from 55 to 80 $m^2/g$; and/or is at least 35 $m^2/g$, such as at least 38 $m^2/g$ after calcining for 20 hours at 1100° C.; e.g. from 35 $m^2/g$, such as 38 $m^2/g$ to 80 $m^2/g$, e.g. from 35 $m^2/g$, such as 38 $m^2/g$ to 65 $m^2/g$;

e.g. the aluminium content, calculated as aluminium oxide obtained is in the range from 35 to 65% by weight of the composition, and the surface area (BET) of the composition obtained, measured according to DIN (Deutsche Industrie Norm) 66131 after calcining for 2 hours at 1100° C. is from 55 to 80 $m^2/g$; and/or is at least 35 $m^2/g$, such as at least 38 $m^2/g$ after calcining for 20 hours at 1100° C.; e.g. from 35 $m^2/g$, such as 38 $m^2/g$ to 80 $m^2/g$, e.g. from 35 $m^2/g$, such as 38 $m^2/g$ to 65 $m^2/g$;

e.g. the aluminium content, calculated as aluminium oxide obtained is in the range from 45 to 65% by weight of the composition, and the surface area (BET) of the composition obtained, measured according to DIN (Deutsche Industrie Norm) 66131 after calcining for 2 hours at 1100° C. is from 55 to 80 $m^2/g$; and/or is at least 35 $m^2/g$, such as at least 38 $m^2/g$ after calcining for 20 hours at 1100° C.; e.g. from 35 $m^2/g$, such as 38 $m^2/g$ to 80 $m^2/g$, e.g. from 35 $m^2/g$, such as 38 $m^2/g$ to 65 $m^2/g$;

e.g. the aluminium content, calculated as aluminium oxide obtained is in the range from 40 to 60% by weight of the composition, and the surface area (BET) of the composition obtained, measured according to DIN (Deutsche Industrie Norm) 66131 after calcining for 2 hours at 1100° C. is from 55 $m^2/g$ to 80 $m^2/g$; and/or is at least 35 $m^2/g$, such as at least 38 $m^2/g$ after calcining for 20 hours at 1100° C.; e.g. from 35 $m^2/g$, such as 38 $m^2/g$ to 80 $m^2/g$, e.g. from 35 $m^2/g$, such as 38 $m^2/g$ to 65 $m^2/g$.

Cerium oxide as used herein includes $Ce_2O_3$ and $CeO_2$, preferably $CeO_2$.

Aluminium oxide as used herein includes $Al_2O_3$.

Zirconium oxide as used herein includes $ZrO_2$.

An aqueous solution of a mixture of metal salts in step (a) is prepared either by dissolving water soluble metal salts, or by dissolving water insoluble metal salts by acid treatment, e.g. $HNO_3$, HCl treatment. Said water soluble metal salts comprise nitrates and/or halogenides, e.g. chlorides, and said water insoluble metal salts comprise carbonates and/or hydroxides.

In a composition obtained according to a process of the present invention Ce, Zr-oxides may optionally being present in the form of a solid-solid solution.

A process provided by the present invention is herein also designated as "A process of (according to) the present invention" and a composition provided according to the present invention is herein also designated as "A composition of (according to) the present invention".

An advantageous embodiment of a process of the present invention is characterized in that the Ce/Zr/Al metal salt solution used according to step (a) contains at least one rare earth metal element, preferably selected from Y, La, Pr, Nd, Sm, Eu, Gd, Tb, Dy, Ho, Er, Tm, Yb and Lu, e.g. La, Nd.

According to the present invention it was surprisingly found that the use of a surfactant in the process of the present invention may significantly increase the stability of the surface area of the composition obtained, if all other measures are met.

Appropriate surfactants for use in a process of the present invention include compounds which lower the interfacial tension of a liquid and a solid, e.g. including organic compounds, e.g. such which are amphiphilic and contain both, hydrophobic groups and hydrophilic groups. Preferred surfactants include nonionic surfactants, e.g. nonionic surfactants comprising ethylene oxide/propylene oxide units, such as Triton®, Tergitol®, e.g. including ethyl phenol ethoxylates and ethylene oxide/propylene oxide copolymers, or lauric acid.

In a preferred embodiment of the invention lauric acid or Triton is used as a surfactant.

The amount of surfactant applied might have an influence on the stability of the surface area Preferred amounts of the surfactant applied include 20% by weight to 80% by weight of the final composition after calcination, more preferably 25% by weight to 75% by weight, such as 30% by weight to 70% by weight.

In a further aspect the present invention provides a composition, e.g. a catalyst composition, obtainable, e.g. obtained, according to a process of the present invention, such as a composition comprising Al—, Ce— and Zr-oxides, which is characterized in that the aluminium content, calculated as aluminium oxide is in the range from 35 to 80%, such as 35 to 65%, such as 45 to 65% by weight, e.g. 40 to 60% by weight, such as 45 to 55% by weight and the surface area (BET) of the composition measured according to DIN (Deutsche Industrie Norm) 66131 for 2 hours at 1100° C. is from 55 to 80 $m^2/g$ and/or is at least 35 $m^2/g$, such as at least 38% $m^2/g$, for example from 35 $m^2/g$, such as 38% $m^2/g$ to 80 $m^2/g$, for example 35 $m^2/g$, such as 38% $m^2/g$ to 65 $m^2/g$ after calcining for 20 hours at 1100° C.

The increase of the surface area of a composition obtainable or obtained according to the present invention compared to a material prepared without a surfactant treatment, is at least 10%, preferably 20%, more preferably 30%, most preferably 40 to 50% after heat treating the material at 1100° C./20 hours.

The significant increase of the surface area of a composition obtained according to the process of the present invention compared to a material prepared without surfactant treatment is well demonstrated in examples 1, 2, 3 and 4. The compounds referred to in the examples 1 to 4 show an increase of the surface area of 46%, 52%, 36% and 79% in comparison to the compounds referred to in comparative examples C1 to C4, which were prepared without surfactant treatment.

The BET of a composition of the present invention, e.g. obtained or obtainable according to the present invention measured according to DIN (Deutsche Industrie Norm) 66131, after calcining for 2 hours at 1100° C. is from about, e.g. from, 55 to 80 $m^2/g$, such as from 55 to 75 $m^2/g$, e.g. 55 to 70 $m^2/g$, e.g. 60 to 70 $m^2/g$, and/or is at least 35 $m^2/g$, such as at least 38 $m^2/g$, for example 35 $m^2/g$, such as 38 $m^2/g$ to 80 $m^2/g$, e.g. 35 $m^2/g$, such as 38 $m^2/g$ to 65 $m^2/g$ after calcining for 20 hours at 1100° C.

In still another aspect the present invention provides a process for the preparation of a composition comprising Al—, Ce— and Zr-oxides, which process comprises the steps of (a) preparing an aqueous solution of a mixture of metal salts of cerium, zirconium and aluminium, which aqueous solution optionally comprises one or more salts of Rare Earth Metals other than cerium, (b) adding to the solution obtained in step (a) a base, optionally in the presence of $H_2O_2$, at temperatures from 0° C. to 95° C. and precipitating obtained mixed metal salts in the form of hydroxides or oxy-hydroxides,
  e.g. either by dissolving water soluble salts such as a nitrate, halogenide, e.g. chloride, or dissolving water insoluble metal salts, such as a carbonate, hydroxide, by acid treatment, such as by treatment with $HNO_3$, HCl, (c) optionally isolating the precipitate obtained in step (b), (d) treating the aqueous suspension obtained in step (b), or the isolated precipitate obtained in step (c) with a surfactant, and (e) isolating the precipitate obtained in step (d) and treating said precipitate at a temperature from 450° C. to 1200° C., characterized in that the surface area (BET) of the composition obtained, measured according to DIN (Deutsche Industrie Norm) 66131 after calcining for 2 hours at 1100° C. is from 55 to 80 $m^2/g$, e.g. from 55 to 75 $m^2/g$, e.g. 55 to 70 $m^2/g$, e.g. 60 to 70 $m^2/g$. wherein said composition has an aluminium oxide content of 40 to 60% by weight.

A process of the present invention is useful for the preparation of a composition with outstanding favorable and surprising properties as described herein, e.g. useful as a catalyst composition, e.g. for exhaust gas aftertreatment of combustion engines.

The percentage (%) of the metal salts as indicated herein, including the examples and comparative examples, are percents by weight.

In the following examples all temperatures are in degree Celsius (° C.) and are uncorrected.

Surface area (BET) analysis was performed with Quantachrome NOVA 4000 according to DIN (Deutsche Industrie Norm) 66131.

PREPARATION OF COMPOSITIONS ACCORDING TO THE PRESENT INVENTION

Example 1

Synthesis of $CeO_2$(10%) $ZrO_2$(36.5%) $La_2O_3$(1%) $Nd_2O_3$(2.5%) $Al_2O_3$(50%)

92.8 g of an aqueous solution of zirconium nitrate ($ZrO_2$ content=29.5%), 26.32 g of an aqueous solution of cerium nitrate ($CeO_2$ content=28.5%), 1.99 g of lanthanum nitrate in crystal form ($La_2O_3$ content=37.7%), 4.91 g of neodymium nitrate in crystal form ($Nd_2O_3$ content=38.2%) and 275.74 g of aluminium nitrate nonahydrate ($Al_2O_3$ content=13.6%) were treated with 600 mL of deionised water, the mixture obtained was stirred for a few minutes and a clear solution was obtained. To the mixture obtained 74.6 mL of aqueous 35% H$_2$O$_2$ cooled to 10° C. were added and the mixture obtained was stirred for approximately 45 minutes. To the mixture obtained aqueous 24% ammonia solution cooled to 10° C. was added until a pH=9.5 was adjusted. The mixture obtained was stirred for 15 minutes and a precipitate formed. The mixture obtained was filtered and the precipitate obtained was washed with deionized water and impregnated with 22.7 g of Triton X-100. The wet cake obtained was dried at 120° C. and calcined at 850° C./4 hours to yield 75 g of CeO$_2$(10%) ZrO$_2$(36.5%) La$_2$O$_3$(1%) Nd$_2$O$_3$(2.5%) Al$_2$O$_3$(50%) composite oxide.

BET after 850° C./4 hours (Fresh material): 162 m$^2$/g
BET after 950° C./5 hours: 127.5 m$^2$/g
BET after 1000° C./4 hours: 116.5 m$^2$/g
BET after 1100° C./2 hours: 66.2 m$^2$/g
BET after 1100° C./20 hours: 45.2 m$^2$/g Example 2

Synthesis of CeO$_2$(25%) ZrO$_2$(20%) La$_2$O$_3$(2.5%) Nd$_2$O$_3$(2.5%) Al$_2$O$_3$(50%)

44.58 g of an aqueous solution of zirconyl nitrate (ZrO$_2$ content=22.43%), 42.44 g of an aqueous solution of cerium nitrate (CeO$_2$ content=29.45%), 3.32 g of lanthanum nitrate in crystal form (La$_2$O$_3$ content=37.7%), 3.3 g of neodymium nitrate in crystal form (Nd$_2$O$_3$ content=37.93%) and 183.82 g of aluminium nitrate nona hydrate (Al$_2$O$_3$ content=13.6%) were treated with 600 mL of deionized water, the mixture obtained was stirred for a few minutes and a clear solution was obtained. To the mixture obtained 42.78 mL of aqueous 35% H$_2$O$_2$ (cooled to 10° C.) were added and the mixture obtained was stirred for approximately 45 minutes. To the mixture obtained, aqueous 24% ammonia solution (cooled to 10° C.) was added until a pH=9.5 was adjusted. The mixture obtained was stirred for 10 minutes, 20.71 g of lauric acid were added and the mixture obtained was further stirred vigorously for 1 hour at room temperature. A precipitate formed. The mixture obtained was filtered and the precipitate obtained was washed with deionized water. The wet cake obtained was dried at 120° C. and calcined at 850° C./4 hours.

50 g of CeO$_2$(25%) ZrO$_2$(20%) La$_2$O$_3$(2.5%) Nd$_2$O$_3$(2.5%) Al$_2$O$_3$(50%) composite oxide were obtained.

BET after 1100° C./2 hours: 55 m$^2$/g.
BET after 1100° C./20 hours: 49.5 m$^2$/g.

Example 3

Synthesis of Al$_2$O$_3$(50%) CeO$_2$(12.5%) ZrO$_2$(35%) Nd$_2$O$_3$(2.5%)

A mixed metal nitrate solution was made by dissolving 84.66 g of cerium nitrate solution (CeO$_2$: 29.53%), 301.2 g of zirconyl nitrate solution (ZrO$_2$ 23.24%), 13.18 g of neodymium nitrate hexahydrate (Nd$_2$O$_3$ 37.93%) and 733.68 g of aluminium nitrate nonahydrate (Al$_2$O$_3$: 13.63%) in 2.0 L of de-ionized water at room temperature. The mixture obtained was stirred for a few minutes and a clear solution was obtained. To the mixture obtained, 189.01 mL of 35% H$_2$O$_2$, cooled at 10° C. were added and the mixture obtained was stirred at room temperature for 45 minutes. To the mixture obtained, aqueous 18% ammonia solution, cooled to 10° C. was added in a short period of time and an pH of 9.5 was adjusted and a precipitate formed. The mixture obtained was stirred for 15 minutes, 86.21 g of lauric acid were added and the mixture obtained was stirred vigorously for 1 hour at room temperature. The mixture obtained was filtered and the precipitate obtained was washed with deionized water. The wet cake obtained was dried at 120° C. and calcined at 850° C./4 hours. 200 g of Al$_2$O$_3$(50%) CeO$_2$(12.5%) ZrO$_2$(35%) Nd$_2$O$_3$(2.5%) composite oxide was obtained.

BET 850° C./4 hours: 129 m$^2$/g
BET 1100° C./20 hours: 39.5 m$^2$/g

Example 4

Synthesis of Al$_2$O$_3$(50%) CeO$_2$(23.5%) ZrO$_2$(23.5%) Nd$_2$O$_3$(3%)

A mixed metal nitrate solution was made by dissolving 46.01 g of cerium nitrate solution (CeO$_2$: 25.54%), 47.73 g of zirconyl nitrate solution (ZrO$_2$ 24.62%), 3.95 g of neodymium nitrate hexahydrate (Nd$_2$O$_3$ 37.93%) and 187.41 g of aluminium nitrate nonahydrate (Al$_2$O$_3$: 13.34%) in 1.0 L of de-ionized water at room temperature. The mixture obtained was stirred for a few minutes and a clear solution was obtained. To the mixture obtained, 45.75 mL of 35% H$_2$O$_2$, cooled at 10° C. was added and the mixture obtained was stirred at room temperature for 45 minutes. To the mixture obtained, aqueous 18% ammonia solution, cooled to 10° C. was added in a short period of time and an pH of 9.5 was adjusted. A precipitate formed. The mixture obtained was stirred for 15 minutes, 33.43 g of lauric acid were added and the mixture obtained was stirred vigorously for 1 hour at room temperature. The mixture obtained was filtered and the precipitate obtained was washed with deionized water. The wet cake was dried at 120° C. and calcined at 850° C./4 hours.

50 g of Al$_2$O$_3$(50%) CeO$_2$(23.5%) ZrO$_2$(23.5%) Nd$_2$O$_3$(3%) composite oxide were obtained.

BET 850° C./4 hours: 138 m$^2$/g
BET 1100° C./20 hours: 39.1 m$^2$/g

Example 5

Synthesis of Al$_2$O$_3$(65%) CeO$_2$(17.25%) ZrO$_2$(13.5%) La$_2$O$_3$(2.125%) Nd$_2$O$_3$(2.125%)

A mixed metal nitrate solution was made by dissolving 29.92 g of cerium nitrate solution (CeO$_2$: 28.83%), 27.42 g of zirconyl nitrate solution (ZrO$_2$ 24.62%), 2.8 g of 1Lantahnum nitrate hexahydrate (La$_2$O$_3$: 37.93%), 2.86 g of neodymium nitrate hexahydrate (Nd$_2$O$_3$ 37.1%) and 833.33 g of aluminium nitrate solution (Al$_2$O$_3$: 3.9%) in 1.0 L of de-ionized water at room temperature. The mixture obtained was stirred for a few minutes and a clear solution was obtained. To the mixture obtained, 76.89 mL of 35% H$_2$O$_2$, cooled at 10° C. were added and the mixture obtained was stirred at room temperature for 45 minutes. To the mixture obtained, aqueous 18% ammonia solution cooled to 10° C. was added in a short period of time and an pH of 9.5 was adjusted. A precipitate formed. The mixture obtained was stirred for 15 minutes. The mixture obtained was filtered and the precipitate obtained was washed with deionized water. The wet cake obtained was impregnated using 23.82 g Triton X-100, dried at 120° C. and calcined at 850° C./4 hours 50 g of Al$_2$O$_3$(65%) CeO$_2$(17.5%) ZrO$_2$(13.5%) La$_2$O$_3$(2.125%) Nd$_2$O$_3$(2.125%) composite oxide were obtained.

BET 850° C./4 hours: 157 m$^2$/g
BET 1100° C./2 hours: 66 m$^2$/g
BET 1100° C./20 hours: 54 m$^2$/g

Example 6

Synthesis of $Al_2O_3(50\%)$ $CeO_2(40\%)$ $ZrO_2(5\%)$ $La_2O_3(2.5\%)$ $Nd_2O_3(2.5\%)$ A mixed metal nitrate solution was made by dissolving 69.37 g of cerium nitrate solution ($CeO_2$: 28.83%), 10.15 g of zirconyl nitrate solution ($ZrO_2$ 24.62%), 3.37 g of lanthanum nitrate hexahydrate ($La_2O_3$: 37.1%), 3.3 g of neodymium nitrate hexahydrate ($Nd_2O_3$ 37.9%) and 641.03 g aluminium nitrate solution ($Al_2O_3$: 3.9%) in 2.0 L of de-ionized water at room temperature. The mixture obtained was stirred for a few minutes and a clear solution was obtained. To the mixture obtained, 40.21 mL of 35% $H_2O_2$, cooled at 10° C. were added and the mixture obtained was stirred at room temperature for 45 minutes. To the mixture obtained, aqueous 18% ammonia solution cooled to 10° C. was added in a short period of time and an pH of 9.5 was adjusted. A precipitate formed. The mixture obtained was stirred for 15 minutes, 19.85 g of lauric acid were added and the mixture obtained was stirred vigorously for 1 hour at room temperature. The mixture obtained was filtered and the precipitate obtained was washed with deionized water. The wet cake obtained was dried at 120° C. and calcined at 850° C./4 hours.

50 g of $Al_2O_3(50\%)$ $CeO_2(40\%)$ $ZrO_2(5\%)$ $La_2O_3(2.5\%)$ $Nd_2O_3(2.5\%)$ composite oxide were obtained.

BET 850° C./4 hours: 97.3 m²/g
BET 1100° C./20 hours: 43.8 m²/g

Example 7

Synthesis of $Al_2O_3(50\%)$ $CeO_2(40\%)$ $ZrO_2(5\%)$ $La_2O_3(2.5\%)$ $Nd_2O_3(2.5\%)$ A mixed metal nitrate solution was made by dissolving 69.37 g of cerium nitrate solution ($CeO_2$: 28.83%), 10.15 g of zirconyl nitrate solution ($ZrO_2$ 24.62%), 3.37 g of lanthanum nitrate hexahydrate ($La_2O_3$: 37.1%), 3.3 g of neodymium nitrate hexahydrate ($Nd_2O_3$ 37.9%) and 641.03 g of aluminium nitrate solution ($Al_2O_3$: 3.9%) in 1.0 L of de-ionized water at room temperature. The mixture obtained was stirred for a few minutes and a clear solution was obtained. To the mixture obtained, 70.1 mL of 35% $H_2O_2$, cooled at 10° C. was added and the mixture obtained was stirred at room temperature for 45 minutes. To the mixture obtained, aqueous 18% ammonia solution, cooled to 10° C. was added in a short period of time and an pH of 9.5 was adjusted. A precipitate formed. The mixture obtained was stirred for 15 minutes, filtered and the precipitate obtained was washed with deionized water. The wet cake obtained was impregnated using 21.72 g of Triton X-100. The wet cake obtained was dried at 120° C. and calcined at 850° C./4 hours.

50 g of $Al_2O_3(50\%)$ $CeO_2(40\%)$ $ZrO_2(5\%)$ $La_2O_3(2.5\%)$ $Nd_2O_3(2.5\%)$ composite oxide were obtained.

BET 850° C./4 hours: 109 m²/g
BET 1100° C./20 hours: 43.4 m²/g

Example 8

Synthesis of $Al_2O_3(65\%)$ $CeO_2(7\%)$ $ZrO_2(25.55\%)$ $Nd_2O_3(1.75\%)$ $La_2O_3(0.75\%)$ A mixed metal nitrate solution was made by dissolving 13.7 g of cerium nitrate solution ($CeO_2$: 25.54%), 51.89 g of zirconyl nitrate solution ($ZrO_2$ 24.62%), 2.31 g of neodymium nitrate hexahydrate ($Nd_2O_3$ 37.93%), 0.94 g of lanthanum nitrate hexahydrate ($La_2O_3$ 37.1%) and 243.63 g of aluminium nitrate nonahydrate ($Al_2O_3$: 13.34%) in 1.0 L of de-ionized water at room temperature. The mixture obtained was stirred for a few minutes and a clear solution was obtained. To the solution obtained, 33.44 mL of 35% $H_2O_2$, cooled at 10° C. were added and the mixture obtained was stirred at room temperature for 45 minutes. To the mixture obtained, aqueous 18% ammonia solution, cooled to 10° C. was added in a short period of time and an pH of 9.5 was adjusted. The mixture obtained was stirred for 15 minutes, a precipitate formed, the mixture was filtered and the solid obtained was washed with deionized water. The wet cake obtained was impregnated with 39.42 g of Triton X-100 and dried at 120° C. The dried product obtained was calcined at 850° C./4 hours. 50 g of $Al_2O_3(65\%)$ $CeO_2(7\%)$ $ZrO_2(25.55\%)$ $Nd_2O_3(1.75\%)$ $La_2O_3(0.75\%)$ composite oxide were obtained.

BET 850° C./4 hours: 70 m²/g
BET 1100° C./2 hours: 67.6 m²/g
BET 1100° C./20 hours: 52 m²/g From examples 1 to 8 it is evident that the BET values of the composition prepared according to the present invention surprisingly are much higher than the BET values of the compositions prepared according to prior art, e.g. which can be seen from the comparative examples C1 to C12 below.

COMPARATIVE EXAMPLES

Comparative Example C1

Synthesis of $CeO_2(10\%)$ $ZrO_2(36.5\%)$ $La_2O_3(1\%)$ $Nd_2O_3(2.5\%)$ $Al_2O_3(50\%)$

Preparation According to the Process Disclosed in Example 1 of EP 1 172 139

92.8 g of an aqueous solution of zirconium nitrate ($ZrO_2$ content=29.5%), 26.32 g of an aqueous solution of cerium nitrate ($CeO_2$ content=28.5%), 1.99 g of lanthanum nitrate in crystal form ($La_2O_3$ content=37.7%), 4.91 g of neodymium nitrate in crystal form ($Nd_2O_3$ content=38.2%) and 275.74 g of aluminium nitrate nonahydrate ($Al_2O_3$ content=13.6%) were treated with 600 mL of deionised water, the mixture obtained was stirred for a few minutes and a clear solution was obtained. To the mixture obtained 4.62 mL of aqueous 35% $H_2O_2$, cooled to 10° C. were added and the mixture obtained was stirred for approximately 20 minutes. To the mixture obtained aqueous 24% ammonia solution cooled to 10° C. was added until a pH=7 was achieved. A precipitate formed. The mixture obtained was stirred for 15 minutes. The mixture obtained was filtered and the precipitate obtained was isolated and washed with deionised water. The wet cake obtained was dried at 120° C. and heat treated at 300° C./5 hours and calcined at 700° C./5 hours.

75 g of $CeO_2(10\%)$ $ZrO_2(36.5\%)$ $La_2O_3(1\%)$ $Nd_2O_3(2.5\%)$ $Al_2O_3(50\%)$ composite oxide were obtained.

BET after 300° C./5 hours and
700° C./5 hours (Fresh material): 148 m²/g
BET after 950° C./5 hours: 101 m²/g
BET after 1000° C./4 hours: 92 m²/g
BET after 1100° C./2 hours: 47 m²/g
BET after 1100° C./20 hours: 31 m²/g

Comparative Example C2

Synthesis of $CeO_2(25\%)$ $ZrO_2(20\%)$ $La_2O_3(2.5\%)$ $Nd_2O_3(2.5\%)$ $Al_2O_3(50\%)$ 44.58 g of an aqueous solution of zirconyl nitrate ($ZrO_2$ content=22.43%), 42.44 g of an aqueous solution of cerium nitrate ($CeO_2$ content=29.45%), 3.32 g of lanthanum nitrate in crystal form ($La_2O_3$ content=37.7%), 3.3 g of neodymium nitrate in crystal form ($Nd_2O_3$ content=37.93%) and 183.82 g of aluminium nitrate nona hydrate ($Al_2O_3$ content=13.6%) were treated with 600 mL of deionized water, the mixture obtained was stirred for a few minutes and a clear solution was obtained. To the mixture obtained 42.78 mL of aqueous 35% $H_2O_2$ (cooled to 10° C.) were added and the mixture obtained was stirred for approximately 45 minutes. To the mixture obtained aqueous 24% ammonia solution (cooled to 10° C.) was added until a pH=7.5 was adjusted. A precipitate formed. The mixture obtained was stirred for 15 minutes. The mixture obtained was filtered and the precipitate obtained was washed with deionized water. The wet cake obtained was dried at 120° C. and calcined at 850° C./4 hours.

50 g of $CeO_2(25\%)$ $ZrO_2(20\%)$ $La_2O_3(2.5\%)$ $Nd_2O_3$ (2.5%) $Al_2O_3(50\%)$ composite oxide were obtained.

BET after 1100° C./2 hours: 39 $m^2/g$.
BET after 1100° C./20 hours: 32.5 $m^2/g$.

Comparative Example C3

Synthesis of $Al_2O_3(50\%)$ $CeO_2(12.5\%)$ $ZrO_2$ (35% %) $Nd_2O_3(2.5\%)$

A mixed metal nitrate solution was made by dissolving 84.66 g of cerium nitrate solution ($CeO_2$: 29.53%), 301.2 g of zirconyl nitrate solution ($ZrO_2$ 23.24%), 13.18 g of neodymium nitrate hexahydrate ($Nd_2O_3$ 37.93%) and 733.68 g of aluminium nitrate nonahydrate ($Al_2O_3$: 13.63%) in 2.5 L of de-ionized water at room temperature. The mixture obtained was stirred for a few minutes and a clear solution was obtained. To the mixture obtained aqueous 18% ammonia solution was added until a pH of 3 was adjusted and to the mixture obtained simultaneously 19.25 mL of 35% $H_2O_2$ along with ammonia solution were added. A precipitate formed and the mixture obtained was stirred vigorously. Further aqueous 18% ammonia solution was added to the mixture obtained until an pH of 7.25 was adjusted. The mixture obtained was stirred for 15 minutes. The mixture obtained was filtered and the precipitate obtained was washed with deionized water. The wet cake obtained was dried at 120° C. and calcined at 850° C./4 hours.

200 g of $Al_2O_3(50\%)$ $CeO_2(12.5\%)$ $ZrO_2(35\%\%)$ $Nd_2O_3$ (2.5%) composite oxide was obtained.

BET 850° C./4 hours: 115 $m^2/g$
BET 1100° C./20 hours: 29 $m^2/g$

Comparative Example C4

Synthesis of $Al_2O_3(50\%)$ $CeO_2(23.5\%)$ $ZrO_2(23.5\%)$ $Nd_2O_3(3\%)$

A mixed metal nitrate solution was made by dissolving 159.16 g of cerium nitrate solution ($CeO_2$: 29.53%), 202.2 g of zirconyl nitrate solution ($ZrO_2$ 23.24%), 15.82 g of neodymium nitrate hexahydrate ($Nd_2O_3$ 37.93%) and 733.68 g of aluminium nitrate nonahydrate ($Al_2O_3$: 13.63%) in 2.0 L of de-ionized water at room temperature. The mixture obtained was stirred for a few minutes and a clear solution was obtained. To the mixture obtained aqueous 18% ammonia solution was added until a pH of 3 was achieved and to the mixture obtained 36.2 mL of 35% $H_2O_2$ along with ammonia solution were simultaneously added. The mixture was stirred vigorously and further aqueous 18% ammonia solution was added until a pH of 7.25 was adjusted. The mixture obtained was stirred for 15 minutes and precipitation occurred. The precipitate obtained was isolated, washed with deionized water and the wet cake thus obtained was dried at 120° C. and calcined at 850° C./5 hours. 200 g of $Al_2O_3(50\%)$ $CeO_2(23.5\%)$ $ZrO_2(23.5\%)$ $Nd_2O_3(3\%)$ composite oxide material was obtained.

BET 850° C./5 hours: 104 $m^2/g$
BET 1100° C./20 hours: 21.9 $m^2/g$

Comparative Example C5

Synthesis of $Al_2O_3(25.98\%)$ $CeO_2(39.47\%)$ $ZrO_2(34.54\%)$ 359.88 g of an aqueous solution of aluminium nitrate nonahydrate ($Al_2O_3$ 3.6%) was dissolved in 200 g of deionized water. The aqueous solution obtained was mixed with 68.46 g of cerium nitrate solution ($CeO_2$ 28.83%), 70.15 g of zirconyl nitrate solution ($ZrO_2$ 24.62%) and 14.62 g of 30% $H_2O_2$. The mixture obtained was stirred for a few minutes to obtain solution 1.

On the other hand 159.6 g of 18% ammonia were mixed with 160 g of deionized water to obtain solution 2.

Both solutions 1 and 2 obtained were mixed under propeller stirring. The mixture obtained was homogenized while stirring using ultraturrax for around 15 minutes. A precipitate formed was filtered and the solid obtained was calcined at 400° C./5 hours under air followed by treatment at 700° C./5 hours under air. 50 g of composite oxide $Al_2O_3(25.98\%)$ $CeO_2(39.47\%)$ $ZrO_2(34.54\%)$ was obtained.

BET 400° C./5 hours and 700° C./5 hours: 119.6 $m^2/g$
BET 1100° C./2 hours: 6.8 $m^2/g$
BET 1100° C./20 hours: 4.8 $m^2/g$

Comparative Example C6

Synthesis of $Al_2O_3(20\%)$ $CeO_2(50\%)$ $ZrO_2(27.5\%\%)$ $La_2O_3(2.5\%)$

A mixed metal nitrate solution was made by dissolving 85.97 g of cerium nitrate solution ($CeO_2$: 29.08%), 58.74 g of zirconyl nitrate solution ($ZrO_2$ 23.41%), 3.31 g of lanthanum nitrate hexahydrate ($La_2O_3$ 37.81%) and 76.69 g aluminium nitrate nonahydrate ($Al_2O_3$: 13.04%) in 400 mL of de-ionized water at room temperature. To the solution obtained 13.24 g of cetyltrimethylammonium bromide were added and the mixture obtained was stirred for 30 minutes. The mixture obtained was co-precipitated with an aqueous solution of ammonia/$NH_4HCO_3$ solution and the pH was adjusted to 8.5. A precipitate forms is isolated by filtration, washed with deionized water and dried continuously at 120° C. for a minimum of 16 hours. The dried precipitate is calcined at 600° C. for 3 hours to obtain a mixed $Al_2O_3$ (20%) $CeO_2(50\%)$ $ZrO_2(27.5\%\%)$ $La_2O_3(2.5\%)$ composite oxide.

BET 1050° C./5 hours: 24.9 $m^2/g$
BET 1100° C./20 hours: 9.9 $m^2/g$

Comparative Example C7

Synthesis of $Al_2O_3(40\%)$ $CeO_2(45\%)$ $ZrO_2$ (12.5% %) $La_2O_3(2.5\%)$

A mixed metal nitrate solution was made by dissolving 77.37 g of cerium nitrate solution ($CeO_2$: 29.08%), 26.7 g of zirconyl nitrate solution ($ZrO_2$ 23.41%), 0.84 g of lanthanum nitrate hexahydrate ($La_2O_3$ 37.81%) and 153.37 g of aluminium nitrate nonahydrate ($Al_2O_3$: 13.04%) in 400 mL of de-ionized water at room temperature. To the mixture obtained 11.92 g of cetyltrimethylammonium bromide was added and the mixture obtained was stirred for 30 minutes. The mixture obtained was co-precipitated with an aqueous solution of ammonia/$NH_4HCO_3$ solution and the pH was adjusted to 8.5. A precipitate formed was isolated by filtration, washed with deionized water and dried continuously at 120° C. for a minimum of 16 hours. The dried precipitate was calcined at 600° C. for 3 hours to obtain $Al_2O_3(40\%)$ $CeO_2(45\%)$ $ZrO_2(12.5\%\%)$ $La_2O_3(2.5\%)$ mixed composite oxide.
BET 1050° C./5 hours: 48 m²/g
BET 1100° C./20 hours: 26.9 m²/g

Comparative Example C8

Synthesis of $Al_2O_3(80.19\%)$ $CeO_2(10.38\%)$ $ZrO_2(7.43\%)$ $La_2O_3(1.71\%)$ $Y_2O_3(0.3\%)$ A mixed metal nitrate solution was made by dissolving 18 g of cerium nitrate solution ($CeO_2$: 28.83%), 15.09 g of zirconyl nitrate solution ($ZrO_2$ 24.62%), 2.3 g of lanthanum nitrate hexahydrate ($La_2O_3$ 37.1%), 0.5 g of yttrium nitrate hexahydrate ($Y_2O_3$ 29.32%) and 1179.24 g of aqueous solution of aluminium nitrate nonahydrate ($Al_2O_3$: 3.4%) in 400 mL of de-ionized water at room temperature and the mixture obtained is stirred for an hour at room temperature. The mixed metal nitrate solution obtained was neutralized using 18% ammonia solution while continuously stirring at room temperature. The mixture obtained was stirred overnight and a precipitate formed. The precipitate produced was filtered, washed with deionized water and dried at 150° C. for a minimum of 16 hours. The dried precipitate was calcined at 600° C. for 5 hours and at 500° C. for 2 hours. 50 g of $Al_2O_3(80.19\%)$ $CeO_2(10.38\%)$ $ZrO_2(7.43\%)$ $La_2O_3(1.71\%)$ $Y_2O_3(0.3\%)$ mixed composite oxide was obtained and ground and thus obtained in the form of a powder. BET was measured after 1100° C./2 hours and 1100° C./20 hours.
BET 600° C./5 hours and 500° C./2 hours: 170 m²/g
BET 1100° C./2 hours: 30.9 m²/g
BET 1100° C./20 hours: 21.2 m²/g

Comparative Example C9

Synthesis of $CeO_2(14.2\%)$ $ZrO_2(34.8\%)$, $Al_2O_3(51\%)$

Preparation According to Example 6 of WO 2006/070201

To 112.5 g of aluminium nitrate nonahydrate ($Al_2O_3$ content=13.6%) dissolved in 1.5 L of deionised water 14.77 g of an aqueous solution of cerium nitrate ($CeO_2$ content=28.85%) and 43.02 g of an aqueous solution of zirconyl nitrate ($ZrO_2$ content=24.27%) were added.

The mixture obtained was stirred for 15 minutes. To the mixture obtained a 25% aqueous solution of NaOH were added whereupon a precipitate formed. The pH value was kept close to 10 during precipitation. To the slurry obtained 5 g of 35% $H_2O_2$ were added and the pH of the mixture obtained was adjusted to 10. The mixture obtained was stirred for 1 hour and the pH of the mixture obtained was adjusted to 8 using 30% $HNO_3$. The slurry obtained was maintained at 60° C. for 1 hour. The mixture obtained was filtered and the solid obtained was washed with deionized water at 60° C. until the electrical conductivity of the filtrate did not change. The wet cake obtained was isolated and resuspended in 850 mL of water, the pH of the slurry obtained was adjusted to 10 and the mixture obtained was autoclaved at 120° C. for 6 hours. The slurry obtained was cooled down and the pH of the mixture obtained was adjusted to 8 using 30% nitric acid. The mixture obtained was stirred for 30 minutes. The slurry obtained was maintained at 60° C. for 1 hour and filtered. The solid obtained was washed with deionised water and directly calcined at 850° C. BET was measured at different ageing temperatures.
BET after 850° C./4 hours: 107 m²/g
BET after 1000° C./4 hours: 77 m²/g
BET after 1100° C./2 hours: 41.2 m²/g
BET after 1150° C./36 hours: 19 m²/g

Comparative Example C10

Synthesis of ZrO2(73%) CeO2(20%) La2O3(2%) Nd2O3(5%) Prepared via Surfactant Treatment A mixed metal solution corresponding to the composition given above was prepared by mixing 27.33 ml of zirconyl nitrate solution ($ZrO_2$: 22.8%) with 121 mL of deionised water, 5.045 g cerium III nitrate ($CeO_2$: 39.6%) with 59 mL of deionised water, 0.53 g of lanthanum nitrate ($La_2O_3$: 37.4%) in 12 mL of deionised water and 1.302 g of neodymium nitrate ($Nd_2O_3$: 38%) in 7 mL of deionised water. The mixture obtained was stirred for a few minutes and a clear solution was obtained.

To the solution obtained 23.2 mL of $H_2O_2$ (30%, Sigma Aldrich, cooled to 5-10° C.) were added. The mixture obtained was stirred at room temperature for about 45 minutes and to the mixture obtained 24% aqueous ammonia solution (cooled to 5-10° C.) were added at room temperature with a dropping rate of 40 ml/min and a pH 9.5 was achieved. The mixture obtained was kept stirring for a few minutes. A precipitate formed and during precipitation the temperature of the mixture raised up to 60° C. Impregnation of the precipitates in the reaction mixture was done by adding 3.77 g of lauric acid to the reaction mixture. The slurry thus obtained was kept at vigorous stirring for at least 4 hours. The mixture obtained was filtered and the solid obtained was washed extensively with deionised water. The filter cake obtained was dried in an oven at 100° C. overnight (16 houts) and calcined at 500° C. for 4 hours. 10 g of ZrO2(73%) CeO2(20%) La2O3(2%) Nd2O3(5%) composite oxide.
BET after 500° C./4 hours (fresh): 110 m²/g
BET 1100° C./4 hours (aged): 18 m²/g

Comparative Example C11

Synthesis of Aluminium oxide ($Al_2O_3$) Out of Aluminium Nitrate Nonahydrate 100 g of aluminium nitrate nonahydrate were dissolved in 500 ml of deionized water and to the mixture obtained 18% aqueous ammonia solution (cooled at 10° C.) were added until an pH of 7.5 was adjusted. The mixture obtained was stirred further for 15 minutes, filtered and the solid obtained was washed with deionized water. The wet cake so obtained was dried overnight at 120° C. and the dried material obtained was calcined at 500° C./4 hours. 13.6 g of Aluminium oxide was obtained. BET was measured after calcining the material 1100° C./4 hours.

BET after 500° C./4 hours: 138 m²/g
BET after 1100° C./4 hours: 1 m²/g

Comparative Example C12

Synthesis of Aluminium Oxide ($Al_2O_3$) Out of Aluminium Nitrate Nonahydrate Using a Surfactant 100 g of Aluminium nitrate nonahydrate were dissolved in 500 ml of deionized water and to the mixture obtained 18% of an aqueous ammonia solution (cooled at 10° C.) was added until a H of 7.5 was adjusted. The mixture obtained was stirred further for 15 minutes and filtered. The solid obtained was washed with deionized water. The wet cake thus obtained was impregnated with 9.34 g of Triton X-100 and dried overnight at 120° C. The dried material obtained was calcined at 500° C./4 hours.

13.6 g of Aluminium oxide were obtained. BET was measured after calcining the material at 1100° C./4 hours.

BET after 500° C./4 hours: 222 m²/g
BET after 1100° C./4 hours: 6.1 m²/g

Comparative Example C13

Synthesis of $Al_2O_3$(40%) $CeO_2$(45%) $ZrO_2$(12.5%) $La_2O_3$(2.5%) According to the Process as Described in CN 101 690 890 Using Polyethylene Glycol as a Surfactant A mixed metal nitrate solution was made by dissolving 83.03 g of cerium nitrate solution ($CeO_2$ 27.1%), 24.81 g of zirconyl nitrate solution ($ZrO_2$ 25.19%), 3.37 g of lanthanum nitrate hexahydrate ($La_2O_3$ 37.1%) and 149.93 g of aluminium nitrate nonahydrate ($Al_2O_3$ 13.34%) in 400 mL of de-ionized water at room temperature. To the solution obtained, 20 g of polyethyleneglycole (Sigma Aldrich) was added and the mixture was stirred for 30 minutes. The mixture obtained was co-precipitated with an aqueous solution of ammonia/$NH_4HCO_3$ solution and the pH was adjusted to 8.5. A precipitate was obtained, isolated by filtration, washed with deionized water and dried continuously at 120° C. for 16 hours. The dried precipitate obtained was calcined at 600° C. for 3 hours to obtain 50 g of $Al_2O_3$(40%) $CeO_2$(45%) $ZrO_2$(12.5%%) $La_2O_3$(2.5%) composite oxide.

BET 1050° C./5 hours: 42.5 m²/g
BET 1100° C./2 hours: 36.8 m²/g
BET 1100° C./20 hours: 34.3 m²/g Comparative Example C14

Synthesis of $Al_2O_3$(40%) $CeO_2$(45%) $ZrO_2$(12.5%) $La_2O_3$(2.5%) According to the Process as Described in CN 101 690 890 Using Polyacrylamide as a Surfactant A mixed metal nitrate solution was made by dissolving 83.03 g of cerium nitrate solution ($CeO_2$ 27.1%), 24.81 g of zirconyl nitrate solution ($ZrO_2$ 25.19%), 3.37 g of lanthanum nitrate hexahydrate ($La_2O_3$ 37.1%) and 149.93 g of aluminium nitrate nonahydrate ($Al_2O_3$ 13.34%) in 400 mL of de-ionized water at room temperature. To the solution obtained, 40 g of polyacrylamide solution (50% w/w solution in DI water, Sigma Aldrich product) was added and the mixture was stirred for 30 minutes. The mixture obtained was co-precipitated with an aqueous solution of ammonia/$NH_4HCO_3$ solution and the pH was adjusted to 8.5. A precipitate was obtained, isolated by filtration, washed with deionized water and dried continuously at 120° C. for 16 hours. The dried precipitate obtained was calcined at 600° C. for 3 hours to obtain 50 g of $Al_2O_3$(40%) $CeO_2$(45%) $ZrO_2$(12.5%%) $La_2O_3$(2.5%) composite oxide.

BET 1050° C./5 hours: 31.2 m²/g
BET 1100° C./2 hours: 8.4 m²/g
BET 1100° C./20 hours: 24.5 m²/g

The invention claimed is:

1. Process for the preparation of a composition comprising Al—, Ce— and Zr-oxides, which process comprises the steps of:
    (a) preparing an aqueous solution of a mixture of metal salts of cerium, zirconium and aluminium, and one or more salts of Rare Earth Metals other than cerium,
    (b) adding to the solution obtained in step (a) a base, in the presence of $H_2O_2$, at temperatures from 0° C. to 95° C. and precipitating obtained mixed metal salts in the form of hydroxides or oxy-hydroxides,
    (c) optionally isolating the precipitate obtained in step (b),
    (d) treating the aqueous suspension obtained in step (b), or the isolated precipitate obtained in step (c) with a surfactant
    wherein the surfactant is a nonionic surfactant selected from the group consisting of ethyl phenol ethoxylates, ethylene oxide/propylene oxide copolymers and lauric acid, and
    (e) isolating the precipitate obtained in step (d) and treating said precipitate at a temperature from 450° C. to 1200° C.,
    wherein the aluminium content, calculated as aluminium oxide obtained, is in the range from 45 to 55% by weight of the composition, and
    wherein the surface area (BET) of the composition obtained, measured according to DIN (Deutsche Industrie Norm) 66131 after calcining for 2 hours at 1100° C. is from 55 to 80 m²/g.

2. A process according to claim 1, wherein an aqueous solution of a mixture of metal salts in step (a) is prepared either by dissolving water soluble metal salts, or by dissolving water insoluble metal salts by acid treatment.

3. A process according to claim 2, wherein said water soluble metal salts comprise nitrates and/or halogenides, and said water insoluble metal salts comprise carbonates and/or hydroxides.

4. A process according to claim 1, wherein the temperature in step (b) is room temperature.

5. A process according to claim 1, wherein the temperature in step (e) is from 600° C. to 1200° C.

6. A process according to claim 1, wherein the cerium content, calculated as cerium oxide, of the composition obtained is in the range from 5 to 70% by weight; and the remainder comprising aluminium oxide, zirconium oxide and oxides of said Rare Earth Metals other than cerium oxide.

7. A composition comprising Al—, Ce— and Zr-oxides and one or more oxide(s) of a Rare Earth Metal other than cerium, wherein an aluminium content, calculated as aluminium oxide obtained, is in the range from 45% to 55% by weight of the composition; and wherein the surface area (BET) of the composition measured according to DIN (Deutsche Industrie Norm) 66131 after calcining for 2 hours at 1100° C. is from 55 to 80 m$^2$/g.

8. A process according to claim 1, wherein the zirconium content, calculated as zirconium oxide, of the composition obtained is in the range from 5 to 70% by weight and the remainder comprising cerium oxide, aluminium oxide and oxides of the Rare Earth metals other than cerium oxide.

* * * * *